United States Patent [19]

Dankese

[11] 4,304,799

[45] Dec. 8, 1981

[54] PROCESSES FOR MAKING MEMBRANES

[76] Inventor: Joseph P. Dankese, 17 Arcadia St., Dorchester, Mass. 02122

[21] Appl. No.: 33,550

[22] Filed: Apr. 26, 1979

[51] Int. Cl.³ .............................. C08J 7/02; C08J 5/22
[52] U.S. Cl. .................................... 427/245; 427/307; 427/341; 521/27
[58] Field of Search .................. 521/27; 427/245, 307, 427/341; 210/23 R, 23 H, 30 R, 32

[56] References Cited

U.S. PATENT DOCUMENTS

| | | | |
|---|---|---|---|
| 4,054,707 | 10/1977 | Quentin | 427/245 |
| 4,132,682 | 1/1979 | Seita et al. | 521/27 |
| 4,136,237 | 1/1979 | Takahashi et al. | 521/27 |
| 4,148,979 | 4/1979 | Asami et al. | 521/27 |
| 4,154,909 | 5/1979 | Seita | 521/27 |
| 4,157,960 | 6/1979 | Chang et al. | 210/23 R |

*Primary Examiner*—Ralph S. Kendall
*Attorney, Agent, or Firm*—Robert A. Cesari; John F. McKenna; Andrew F. Kehoe

[57] ABSTRACT

An improved process for modifying the properties of membranes, particularly ion exchange membranes, and novel membranes characterized by a unique combination of low gas permeability and low electrical resistivity. The process comprises the steps of modifying the morphology of a pre-membrane by subjecting it to a chemical reaction, advantageously with a reactive macromolecular solute in an organic solvent.

24 Claims, 10 Drawing Figures

PROCESSES FOR MAKING MEMBRANES

BACKGROUND OF THE INVENTION

This invention relates to novel membranes of substantially improved transfer properties. The invention relates particularly to improved ion exchange membranes and methods of their preparation and also to improved apparatus utilizing stacked cells of membranes, e.g. fuel cells, water electrolysis apparatus, and such electrochemical manufacturing cells as chlor alkali cells.

Solid-polymeric ion exchange membranes are well known in the art. In general, they are formed of a backbone polymer system which comprises an inert chain and branches with functional groups capable of exchanging anions with cations or vice versa. These membranes are utilized in a wide variety of applications including, fuel cells, electrochemical production cells such as caustic chlorine cells, water electrolysis cells, high-energy density batteries and the like. Non-ionic membranes are also used in various reverse osmosis or ultrafiltration processes, e.g. water desalting, electropaint recovery processes, cheese whey processing, water pollution control, by-product recovery and numerous other applications requiring removal of some kinds of molecules from solutions. Among the better known ion exchange membranes are those represented by the perfluorosulfonic acid membranes available from E. I. duPont DeNemours & Co. (Dupont) under the trademark NAFION. These membranes are well known in the art. See "Nafion", an Electrochemical Traffic Controller, pages 10–13 of *DuPont Innovation Volume 4 No. 3 (1973) by Vaughan.*

This material is reported to be a copolymer of tetrafluoroethylene (TFE) and a sulfonyl fluoride vinyl ether (PSEPVE).

Other well known ion exchange membranes which may be processed according to the invention are based on high density polyethylene skeletons and those based on polyvinylidene fluoride or polyvinylfluoride skeletons. Asahi Chemical Industry supplies ion exchange membranes having a styrene-divinyl benzene (DVB) base and another based on perfluorocarboxylic acid polymeric structure.

A problem that has been virtually universal in the development of ion exchange membranes has been the necessity of balancing a desirably low fluid transfer (mass transfer) characteristic against other characteristics of the membrane. In ion exchange membranes, the balance has typically been made with attention to the maintenance of good electroconductivity for the membrane, and this requirement has tended to limit the extent to which low electroresistivity characteristics can be achieved.

As will be described below, the present inventor has directed his attention to the provision of ion exchange membranes which have both improved low permeability and low electrical resistivity characteristics. In so doing, he has also provided means to provide improved reverse osmosis, ultrafiltration, and dialysis membranes.

SUMMARY OF THE INVENTION

It is a principle object of the invention to provide improved membranes of the type formed of solid polymeric materials.

It is another object of the invention to provide a process for beneficially modifying the structure of polymeric membranes, especially ion exchange membranes.

Another object of the invention is to provide membranes having a substantially improved combination of (a) reduced fluid permeability and (b) a relative advantage with respect to another parameter, e.g., the passage of electricity in the case of ion exchange membranes or the passage of a relatively small solute molecule in the case of an ultrafiltration membrane.

A further object of the invention is to improve the characteristics of perfluorosulfonic acid membranes and other membranes formed of polymers characterized by chemically resistant, especially fluorocarbon backbone segments.

Another aspect of the invention is the discovery of novel materials for making membranes which exhibit excellent physical characteristics and excellent mechanical properties.

Still another object of the invention is to provide a convenient process to select and make a plurality of membranes which have electrical and physical properties selected from any within a broad range.

Another object of the invention is to provide membrane-moderated apparatus which has greatly improved efficiency and novel means for operating said apparatus.

Another object of the invention is to provide apparatus of the type comprising a stack of ion exchange membranes wherein the generation of internal heat can be alleviated by the use of a series of membranes having graded electrical resistivities.

Other objects of the invention will be obvious to those skilled in the art of manufacture and use of membrane technology on their reading of this disclosure.

The above objects have been substantially achieved as a consequence of the discovery that the structure of existing membranes can be substantially and beneficially modified by subjecting the membranes to a process wherein the membranes are subjected to chemical action of a solution comprising solutes of selected, preferably macromolecular reactants, in organic solvents.

Among membranes which may be treated according to the process of the invention are tetrafluorethylene (PTFE)-based ion exchange membranes, anionic and cationic, e.g. those sold under the designation "1000 Series" by Radiation Applications, Inc. Other membranes are those based on polymers comprising PTFE-type polymeric chains and having dependent groups typified by, for example, such and other such groups. The series of membranes sold under the trade designation Nafion by DuPont are typical of membranes which can be suitably processed by the process of the invention. Indeed, the process appears to be of special advantage when used to treat isotropic ion exchange membranes. Ion Exchange membranes with polyolefin-type or styrene-divinyl benzene backbone chains are among those which are useful when treated by the process of the invention.

Typical solutes useful in the invention are such macromolecular materials bearing electronegative groups such as polyether sulfones, (PES) and polyvinylidene fluoride (PVF$_2$) typically those having molecular weight of from 2000 to 200,000. Such materials provide suitable solutes at room temperature. However, lower molecular species of materials comprising electronegative functional groups may be used to speed up the reactions and allow use of lower reaction temperatures as may be desireable for a given application.

Some polyether sulfones which are useful in the practice of the invention include those typified by the range of polysulfones sold under the trade designations 200P, 300P, 100P and 720P by ICI, U.S.A. The higher grade numbers generally denote higher temperature resistance. There materials tend to flex even at $-100°$ and to soften at well above 200° C. They have a long term utility at 185° C. or higher, with some being useful above 400° F. They have excellent chemical resistance to a range of materials including acids, alkalies and oils. Number average molecular weights of these polysulfone are typically in the 5000 to 7000 range. There is a considerable variation in weight average molecular weights; e.g. the 200P grade is believed to have about a 140,000 molecular weight, and the 300P grade is believed to have about a 225,000 molecular weight. The physical and chemical properties of these polymers, some of which are left in the structure of the treated membranes, are believed to make an important contribution to the finished membranes which have been exposed to treatment by these polymeric solutes. The polyether sulfone polymers, are para-phenylene units linked by alternate, sulfone and ether linkages. These bonds have excellent resistance to thermal and chemical attack, particularly oxidative attack because the oxygen atom is already in its highest state of oxidation. Moreover, they possess a highly resonating structure, the sulfone group tending to attract electrons from the phenyl ring.

Another useful solute is polyvinylidene fluoride, e.g. a material which will typically exhibit a melting point of about 340° F. This material too is characterized by excellent resistance to thermal and chemical, particularaly oxidative, attacks. Such polymers are available under the trade designation KYNAR from Pennwalt Corp. The presence of chloride in the membranes is undesirable in some applications and its use is best avoided unless one can select and control the application in which the membrane can be used.

Still another useful solute is the polysulfones polymer sold by Union Carbide Corporation. In such polymers the phenyl and/or biphenyl radicals are linked by ether, and sulfone groups respectively. The aromatic structure gives excellent resistnce to oxadative degradation. Nevertheless, these solutes are less desirable for many uses than the polyether sulfone polymers described above, but they are operable and can be handled in such solvent media as DMF, dioxane, THF, acetophenone and the like. Somewhat similar polysulfones are available from 3M Corporation and are also useful.

Functional groups on the membrane solutes are preferably those electronegative groups which include methyl, hydroxyl, chloro, fluoro, nitro, CF$_3$ or CCl$_3$ moieties. Of these the halogen bearing groups are found to be preferred. The nitro groups contribute improved dissociation and stability to electrophilic attack. Smaller quantities of methyl and hydroxyl can facilitate solubility and dissociation, respectively, but their overall contribution to the invention is negative unless other groups predominate to assure sufficient resistance to electrophilic stability, sufficient solubility and a sufficient dissociation characteristic. Yet the preferred solutes are those which comprise polymers which are shaped to facilitate their attachment into the membrane structure. A generally linear form is an aid to such attachment. Moreover, ether groups can permit a freedom of motion in a molecule which enhances the ability of a polymer to enter otherwise non-accessable surfaces. Polyether sulfones are particularly desirable in respect to such geometrical or stereochemical aspects as discussed herein. Moreover, membranes treated with polyether sulfones and like solutes exhibit little of the so-called "cage effect" whereby an apparent decrease in protonic concentration is realized because of the steric inhibition of high molecular structures. Indeed, the polyether sulfones and other solutes used according to the preferred modes of the invention seem to markedly increase availability of useful protonic sites in membranes of the invention, usually so that the resistivity is reduced to 50% or even even 5% of that of the non-treated membrane. The ion exchange membranes prepared according to the invention appear to exhibit a very desirable ionic association between the matrix conducting membrane with ion exchange groups more available according to the aforesaid diminishment of the cage effect and the ion of the solute similar to an ion pairing. But the "counterions" of the solute are not covalently bound to the backbone polymer of the membrane. Consequently the backbone chain structure of the membrane does not limit the ion-bearing capacity of the membrane as it has in the prior art. To the contrary, the ion exchange groups are more freely dissociable and, therefore, free to carry current.

Among other useful solutes can be polyarylene ether including that material having excellent resistance to many classes of chemicals, and available from UNIROYAL Corp. under the trade designation Arylon T. Also ionomers, e.g. those resin systems which are readily crosslinked into an intermolecular structure, usually by a carboxylate linkage, are useful. Some such materials are available under the trade designation Surlyn from DuPont.

Perfluoroalkoxy resins are useful. They are very stable to chemical and thermal attack. These polymers are characterized by a $(CF_2)_n$ backbone and a chain such as —O—$(CF_{2n+1})_n$ By proper selection of solvents, all of the above polymers which are useful as solutes may, if first fabricated into suitable membrane structures, be treated with one or more of the other solutes to form membranes according to the invention.

Typical solvents are such organic solvents as N,N dimethyl formamide (DMF) and N,N dimethylacetamide (DMA). Other solvents which typify those which are useful in the process of the invention include diethylformamide, (DEF) dimethyl sulfoxide (DMS), ethylene oxide, N-methyl pyrrolidone and cylclopentanone, methyl ethyl ketone and cyclohexanone. The selection of other solvents is well within the skill of those skilled in the art when the instant disclosure is combined with such known teachings relating to the art of solvent-selection as for example, appears in an article entitled "A Three-Dimensional Approach to Solubility" by Crowley et al at Pages 269–280 of Journal of Paint Technology (Volume 38, No 496; 1966). Such selection will, of course, depend on which polymer is being used as a solute and the chemical nature of the membrane to be treated.

The invention can be implemented to process and improve membranes already known to the art, thereby converting them into membranes according to the invention. Although applicant does not wish to be bound by any particular theory, it is believed that there are a number of things which happen to the membrane during processing. First, there is usually a removal of membrane material. This removed material includes loss of some ion exchange material as discussed above and thereby alleviating the aforementioned cage effect, but usually—and preferably—less than about 15% of the ion exchange material of the original membrane. The removal of this material, especially from an extruded isotropic membrane, is believed to contribute substantially to improved transfer characteristics of the resulting membrane. For example, in a typical ion exchange membrane, the removed material actually contributes to the lower electrical resistivity characteristics of the membrane despite loss of some of the ion exchange material. Also, there is apparently solvent-swollen the deposition and replacement of material within the membrane structure. Reactive or mechanical deposition of the solute within undesirable pores or voids occurs, as does the displacement of some original membrane material to a more favorable position within the membrane. One overall effect is a substantial increase in the water-bearing capacity of the membrane which can be contributed by removal from the membrane of surface materials less able to hold water and partial replacement of such materials with parts of the solute polymer. It is notable that this increase in water content is achieved with a reduction in permeability. This is believed to be due to the high content of dissociable protons available ion exchange groups as made possible by the alleviation of the aforesaid cage effect.

Depending on the solute and solvent used, the concentrations used, the temperature and times of the process, it is possible to have a greater or smaller proportion of the overall effect of the process on the membrane attributable to one or another of these phenomena. Thus it is possible and practical to tailor entire families of membranes having any combination of properties. In general, the properties will exhibit an improved combination of decreased fluid permeability coupled with an increase in the rate of transfer of some desirable parameter such as electroconductivity (in the case of an ion exchange membrane) or in relative transfer of some molecular species or ionic species of certain sizes as in the case of an ultrafiltration membranes, or reverse osmosis membranes.

Another advantage of the ion exchange membranes of the invention is that it provides an excellent means for holding electrolyte. For example, after the membrane is removed from the reaction solution and washed off, it is dipped into a solution of 85% phosphoric acid and equilibrated therein. The resulting membrane is not wet to the touch and the phosphoric acid is not readily squeezed from it. However the electrical conductivity is excellent and the temperature resistance of the resulting membrane is extraordinary.

Such membranes are very great improvements over the phosphoric-acid membranes which rely on a mere absorption of the electrolyte into a porous sheet rather than the enhanced ionic and hydrogen-bonding effects of the membrane of the invention.

The water present in the electrolyte is held in stable relation with the membrane at temperature far exceeding even 400° F.

A particular advantage of the membranes of the invention and the method for their manufacture is based on the fact that they are in an excellent state for fabrication upon their being removed from the reaction solution. For example, on being removed from solution, they are in an already-expanded form similar to that they will encounter in use. Thus, when put in a metal or plastic frame (e.g. expanded or perforated metal sheets coated with TFE or other chemically inert material) in the expanded condition, they will not be subjected to development of post-framing stresses commonly encountered in prior art membranes. Moreover, the treatment in the reaction solution makes the membranes more malleable and they are, on that account, more easily manipulated while being placed in frames. Another important fabrication advantage is achieved from the fact that the membranes of the invention, on being removed from the reaction solution, have sufficient mutual attraction that they can be readily adhered to one another, i.e. combined into a laminate structure by mere pressing one against the other.

It is to be noted that the advantages of the membranes of the invention, particularly gas permeability resistance, is markedly enhanced by forming laminates from the membranes. Thus, the single-membrane data disclosed herein, although indicating substantially improved performance over that obtainable with prior art membranes, is still far inferior to that obtainable where the membranes are laminated into multiple-ply structures.

Relative nitrogen permeability of the membranes described herein is carried out using high purity nitrogen. The membrane is first equilibrated in water, then equilibrated at ambient conditions in air to a substantially steady weight. The exposed membrane area is about two inches in diameter. Nitrogen pressure was 100 psig—The pressure on the other side of the membrane was about four inches of water absolute. The measurement is carried out in a standard high pressure reverse osmosis type cell. The measurement is made by measuring the advance of a gas/liquid interface on the low pressure side of the cell as a function of time. This test is run for at least 140 hours, often to 1000 hours.

Relative measurement of water permeability was carried out in the same kind of reverse osmosis cell. Again the membrane is equilibrated with water at ambient temperatures. Liquid water is pressured 100 within a psig source of nitrogen and downstream the water is collected. Measurement times are again, 140 to 1500 hours.

Figure 6:
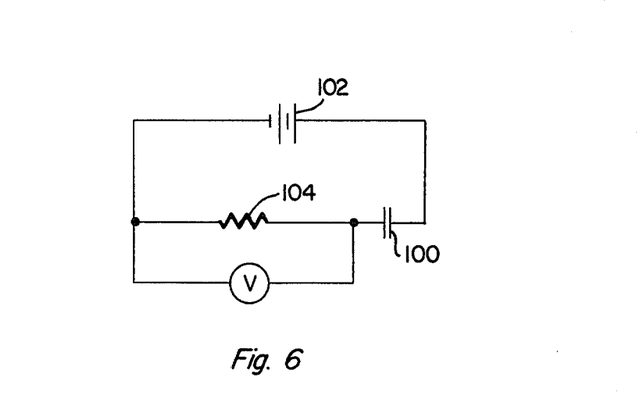
FIG. 6 is a diagram indicating a circuit for testing membrane resistivity.
Figure 7:
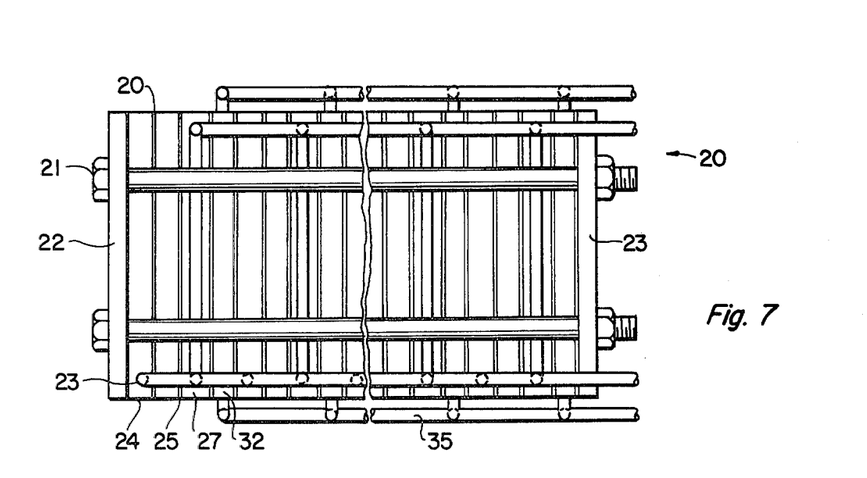
FIGS. 7 and 8 are schematic diagrams of a novel stack formed of graded-resistance membranes.

Comparative membrane resistivity has been evaluated by placing the membrane to be tested between two 0.030-inch thick porous separators, clipping the resulting assembly together to assure good and repeatable contact, and mounting the assembly between electrodes of about 0.585 inch diameter. As shown in FIG. 7, a 1.62 volt battery (102) is used as the voltage source. Resistor 104 is about 390 ohms±10%. Before testing, the membrane 100 of FIG. 6 and the porous separators are been equilibrated in 0.6 NaCl for at least one day. The current is passed through the membrane until a steady voltage is achieved. This is about one minute.

In addition to the reduced thickness, the water equilibrated membranes prepared according to the invention exhibit a substantial increase in very small translucent areas when inspected under a microscope, e.g. as at 20 to 100 times magnification viewed with transmitted light.

Illustrative Embodiments of the Invention

In this application there are described preferred embodiments of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

EXAMPLE NO. 1

A membrane sold by DuPont under the trade designation Nafion 120 was selected for demonstration of the process. The membrane is equilibrated in DMF solvent. This equilibration is believed to substantially remove any moisture in the membrane.

Separately, a solution of a polyether sulfone polymer (molecular weight about 144,000) sold under the trade designation 200 P by ICI, Unites States, Inc. of Wilmington, Del. is prepared in DMF. The solution, really a reactant as well as a reaction medium, comprises a known weight of the solute polymer.

The equilibrated membrane is placed in the reaction medium at about 68° F. and is allowed to stay in the reaction medium for a period of several days. A residue of solid material is seen to appear on the membrane surface and is removed by swirling the membrane periodically, e.g. two times each day.

This process is carried out for six days on for a large number of membrane samples using different concentrations of the polymeric solutes. The membrane is then removed from the medium and thoroughly washed.

Figure 1:
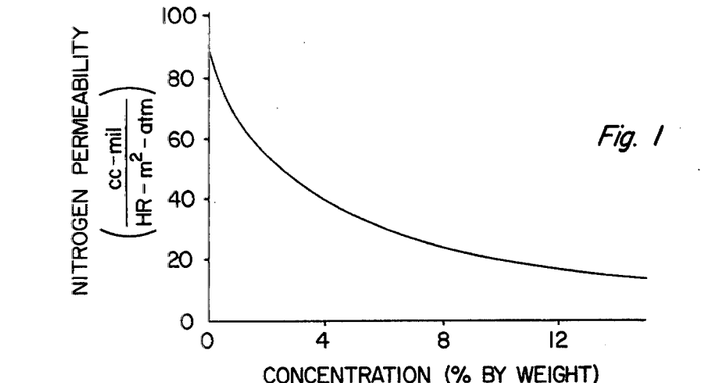
FIG. 1 illustrates one way by which nitrogen permeability is modified by the process of the invention.

As indicated in FIG. 1, the nitrogen permeability of the membranes falls as low as about 15% of the nitrogen permeability of a control membrane which has not been treated according to the invention when as much as a 15% concentration of solute is used. Even with a 2.5% concentration of solute the nitrogen permeability of the membrane is cut to about 50% of the control membrane of the Nafion 120-type.

Figure 2:
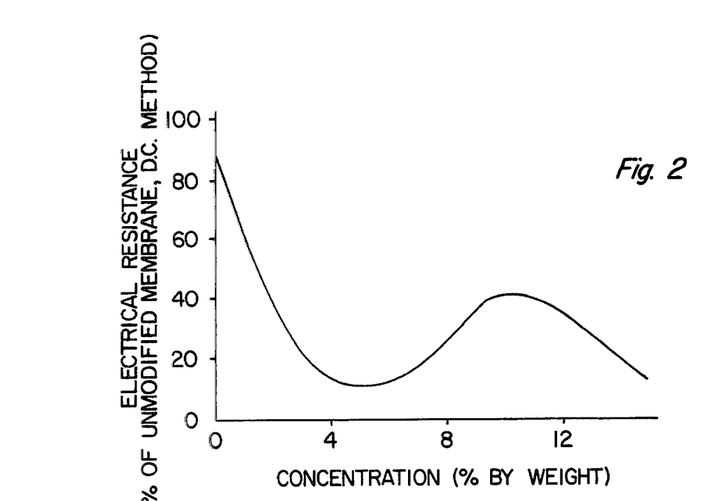
FIG. 2 illustrates one way by which electrical resistivity of a membrane is modified by the process of the invention.

Moreover, as seen in FIG. 2, the electrical resistance of the membrane drops sharply for membranes treated with more dilute solutions, then tends to rise somewhat. Nevertheless, it is seen that it is possible to reduce the resistivity of the membrane to as low as about 10% of the resistivity of the control membrane, i.e. one not treated according to the process of the invention.

Figure 3:
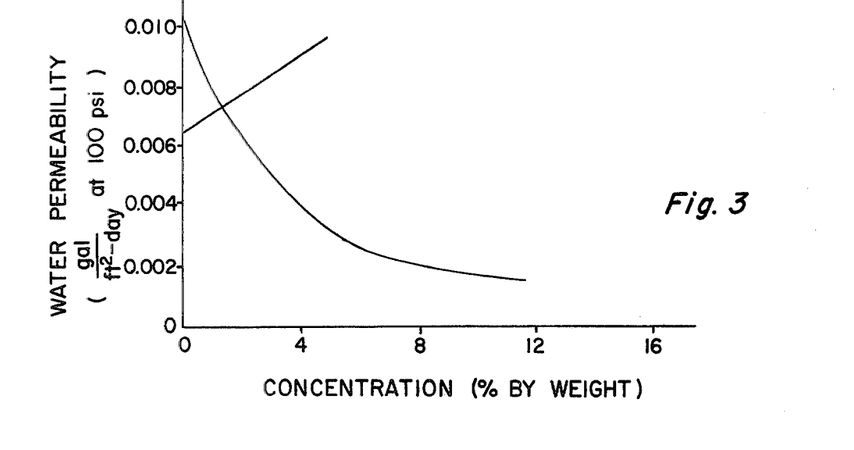
FIG. 3 illustrates how water permeability of a membrane can be modified by the invention.

FIG. 3 shows another measure of the decrease in fluid permeability in terms of water permeability in terms of gallons per square foot day at 100 psi differential pressure.

EXAMPLE NO. 2

Example No. 1 was repeated excepting that the solute was in a 5% concentration and the solvent was changed from DMF to DMA. After six days, the nitrogen permeability had dropped to about 55% of the control's permeability and the membrane electrical resistance had dropped to about 48% of the control's resistivity.

EXAMPLE 3

Example No. 2 was repeated excepting that the solvent was changed to a 50/50 mixture of DMA and DMF. The electrical resistivity of the membrane dropped to only 5% of that of the control. However, the nitrogen permeability was about 35% of that of the control's. Thus it is suggested that a combination of solvents provides a synergistic means to reduce resistivity markedly.

EXAMPLE 4

Figure 4:
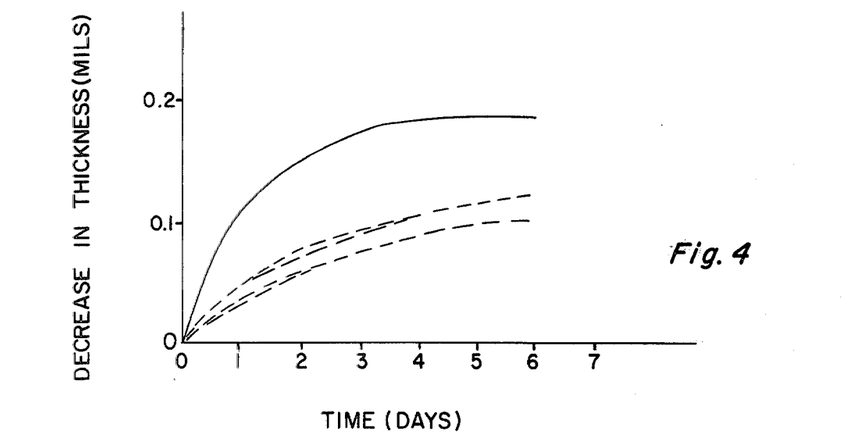
FIG. 4 indicates one parameter of how membrane treated by process invention is structurally modified in proportion to reaction time.
Figure 5:
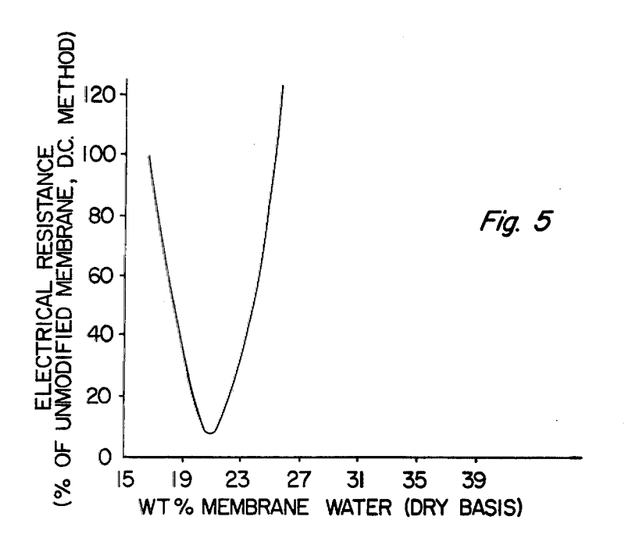
FIG. 5 is a diagram indicative of the ability of membranes to pick up water.

It has been recognized that the membranes are decreased somewhat in thickness during the processing according to the invention. FIG. 4 illustrates the time effect of this procedure and also indicates the time profile of the process of the invention as applied to a perfluorosulfonic acid type membrane of the type sold by DuPont under the trade designation Nafion 125. The solute was a polyether sulfone sold under the trade designation 300 by ICI United States, Inc. The solvent was DMF.

In general, the reaction rate may be deduced to be such that substantial beneficial reaction takes place within a couple of hours even when a relatively high molecular weight solute and a 70° F. temperature are used.

EXAMPLE 5

Example 1 is repeated excepting that the reaction solution is comprised of a 4.8% DMA solution of polyvinylidene fluoride polymer characterized by a molecular weight of about 250,000 and commercially available from Pennwalt.

After 6 days of treatment, the membrane was tested. It had a electrical resistance of 37.5% of the non-treated control. The water permeability increased by about 25%; however, the combination of properties remained excellent.

EXAMPLE 6

An ion exchange membrane was selected which was based on a high-density, radiation crosslinked, polyethylene polymer. The membrane had a specific density of about 1.064 and a nominal ion exchange capacity of about 1.3 milliequivalents per gram. The membrane was 7.8 mil thick and of the type known in the art, and exhibited an excellent combination of (a) electrical resistivity and (b) resistance to nitrogen permeability.

EXAMPLE 7

Example 1 is repeated for a shorter period of time using a perfluorocarboxylic acid type of ion exchange membrane. Substantial improvements in the combined fluid resistance/electrical resistivity measurements are achieved after a reaction time of only 24 hours. There is a marked drop in resistivity.

EXAMPLE 8

Another membrane treatment is carried out using a solute comprising equal portions of the polyethersulfone of the 200P type and polyvinylidenefluoride ($PVF_2$). The solvent was a 50:50 mixture of DMF and DMA. Reaction time was 6 days. The membrane itself was of the type sold under the trade designation Nafion 120.

After six days reaction time, the membrane had lost 0.136 mils in thickness and about 1.9% in weight. It exhibited vastly improved conductivity characteristics.

EXAMPLE 9

The use of the invention in improving the ultrafiltration characteristics of a membrane is disclosed herein.

A 5% solution of polyether 200P was prepared in a 50/50 DMF/DMA mixture. A membrane of the Nafion type (but which had been prepared by molding and skiving rather than an extrusion technique) was treated for six days. It lost 0.362 mils in thickness. It exhibited a 0.0112 gallon per day water flux at 100 psig operating pressure while rejecting 100% of the dye from a dilute solution of the dye known in the art as Biberich Scarlet. This dye has a molecular weight of 556.

The same membrane rejected 78.6% of riboflavin (molecular weight of 376), and only a 13% salt rejection under the 100 psig evaluation conditions.

This membrane typifies those of substantial value in low flux/high surface area applications, for example those utilizing a large number of tubular membrane configurations.

EXAMPLE 10

Figure 9:
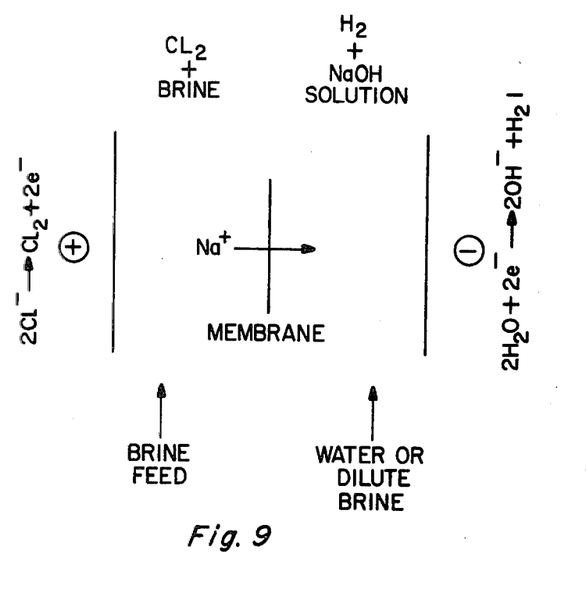
FIG. 9 is a schematic diagram of a caustic chlorine cell using a membrane of the invention.

Performance of a chlorine-alkali cell of the type known to the art and illustrated in FIG. 9, a typical example of an electrochemical reactor, was evaluated using membranes of the invention. Nominal cell operation was at 90° C.

A second membrane was prepared from a Nafion 125 perfluorosulfonic acid membrane according to the invention using a 10% solution of P300 in DMF for a six-day reaction period. The cell was operated at various concentration of sodium hydroxide variously ranging from 4.2 N to 10 N. The current efficiency of the cell dropped from close to 100% to 50% for this range of sodium hydroxide concentration. At 6 N the efficiency was 66.7%.

In comparison, a untreated Nafion 7 mil 1200 EW membrane which was not treated according to the invention dropped to a 68% efficiency at only a 3 N NaOH concentration.

EXAMPLE 11

A Nafion 120 membrane was treated in the 200P polyethersulfone solution (10% solute in DMF) for six days. The resulting polyethersulfone membrane was operated in a fuel cell (single-cell) at DC cell voltages ranging from about 0.95 to 0.7, current densities in this range were roughly from 50 amps per square foot to 600 amps per square foot at 220° F. This performance is far superior to that of the untreated membrane. For example, resistivity values of the untreated membrane are at least twice as high for given current densities. Similar advantageous comparisons between commercial and untreated membranes were made at 120° F. Also nitrogen diffusion was less than about 50% for the membrane of the invention as compared to the untreated membrane.

The above examples are illustrative of ways to modify existing membranes, e.g. extruded membrane structures, to improve their properties. Indeed, it appears to be more economically feasible to modify membranes made by existing manufacturing techniques than to attempt to duplicate the precise structure of the improved products in the initial membrane-forming reaction. As indicated in the foregoing Examples, it is important to agitate, or wipe, the membrane during processing to assure removal of undesirable portions thereof and consequent exposure of the membrane to the reaction medium. It will be obvious to those skilled in the art that continuous recycling of reaction media, and more vigorous agitation, use of higher temperatures, and use of solutes having more activity, all can markedly reduce the processing times specified in the foregoing examples which were run at sufficiently slow reaction rates to facilitate a careful evaluation of the treating processes.

One of the interesting aspects of the above-described process is the fact that it provides by-products which themselves are of particular value. Thus, for example, the solid material removed from the membrane proves itself to be a novel excellent membrane-forming material characterized by excellent mechanical strength and chemical resistance to, e.g., organic solvents. In the case of ion-exchange membranes it is an ion-exchange membrane itself, although it is capable of being formed, by solvent-casing or extrusion, into an excellent reverse osmosis membrane or ultrafiltration membrane, either anisotropic or isotropic depending on the fabrication procedure.

Another excellent by product is the reaction residue which remains in solution. Again this material will comprise a cationic character when an cation exchange membrane has been treated. Such cationic solutes will find ready application as cationic additives in many processes including ultrafiltration processes wherein they aid in preventing anionic material from fouling a membrane surface. Also, such ionic solutes themselves can be recovered, as by evaporation, in the form of membranes having valuable transfer properties and excellent mechanical properties.

Another particular advantage of the invention is the ease with which one can manufacture a group of membranes with graded properties. An important illustration is to vary the electrical resistance of membranes by, for example, varying the concentration of reaction solute, in which they are processed, the time of processing in a given solute etc. Since the heat generated by the passage of electric current across a membrane will be proportional to the product of the square of the current and the resistance, it has been a problem to dissipate the amount of heat which is generated in the interior membranes of, e.g., those in the interior of a stack of membranes in a fuel cell or caustic chlorine cell. This problem has usually been avoided by adoption of some process-limiting parameter, i.e. reduction of the electrical current from the fuel cell. Using membranes of the invention, it would be possible to avoid a overheating of central membranes by simply selecting their resistivity in proportion to the rate at which their position in a stack allows them to have heat dissipated.

It will be appreciated that, in a series of cells, with the resistance of each cell equal, the cell temperature will be higher as one measures closer to the central portion of the assembly. This is because of the resistance, which is equal to the square of the current times the resistance, combined with the insulative effects of subsequent cells. However, if the resistances of the cells are so selected that they are graded to be lower near the center and higher, near the ends of the stack of cells, the heat generation of the more centrally located cells can be lowered to optimize the performance of the stack. Indeed, in chlor-alkali cells, very substantial saving in power costs which are up to 50% of the operating costs, are attainable. In water electrolysis, power costs often reach 75% of the operation costs. Thus the cells of the invention may yield substantial savings in the operation of said cells.

Figure 8:
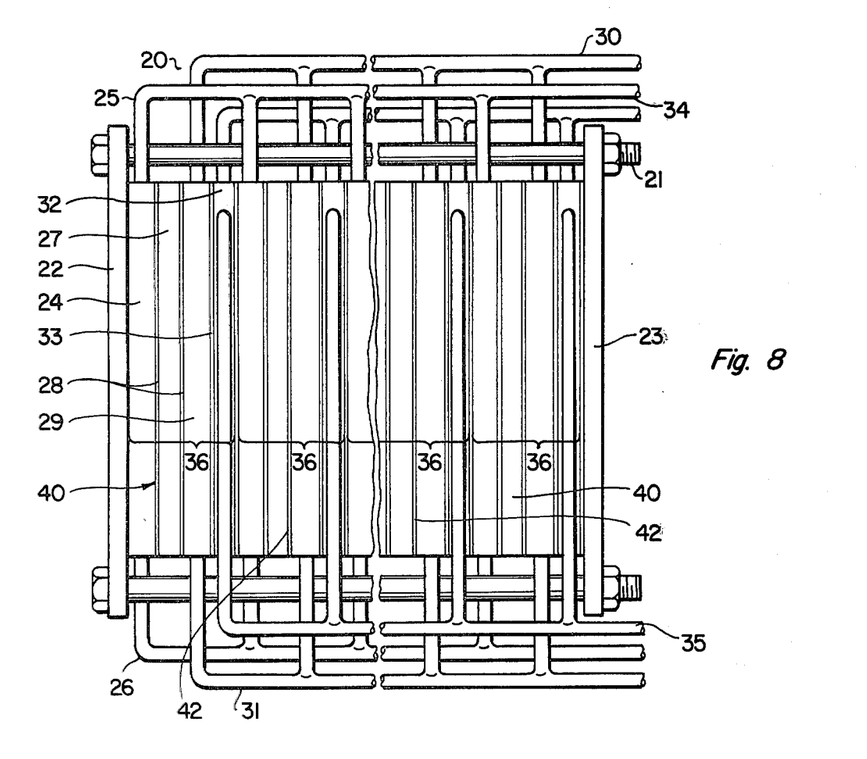

FIGS. 7 and 8 illustrate a fuel cell 20 constructed according to the present invention. The cell is held together by tie-bolt assemblies 21 extending between end plates 22 and 23. Mounted adjacent the card plate 22 is a channeled perforate sheet assembly 24. A fluent fuel may be supplied to the assembly 24 through inlet fuel conduit 25. Exhaust conduit 26 may be employed to discharge fuel or to purge the assembly. Fuel flow through conduits 25 and 26 may be controlled by valves, not shown. An electrolyte-bearing fuel cell membrane 27 provided with catalytic material 28 on opposed faces thereof is mounted adjacent the fluid-distribution sheet assembly 24. A channeled fluid distribution sheet assembly 29 is mounted adjacent the membrane 27. Inlet oxidant conduit 30 delivers oxidant to the assembly 29 while oxidant and cell reaction products may be exhausted through conduit 31. A channeled fluid distribution sheet assembly 32 faced with imperforate sheet 33 is mounted adjacent the oxidant assembly 29. Coolant is supplied to the assembly 32 faced with fluid distribution sheet 33 is mounted adjacent the oxidant assembly 29. Coolant is supplied to the assembly 32 through 34 and exhausted through conduit 35.

Fuel assembly 34, membrane 27, oxidant assembly 29 and coolant assembly 32 together form a single call of the apparatus as indicated by reference numeral 36. A fuel cell having the desired voltage or current characteristics may be built up controlling the number of cells employed.

In such stacks of membrane-moderated cells constructed according to the invention, there is an enormous improvement in operating characteristics and efficiency merely as the result of the use of membranes of the invention. However, a particular advantage is that membranes of the invention can be graded to have lower resistances at interior cells 40 than at exterior cells 42. Still lower resistances would be used for membranes in the more interior sections of the stack.

The advantages which may be achieved in operation of electrochemical reactors (whether they be used for chemical synthesis, energy generation, water purification, or like processes) are sufficiently great that they provide overall advantage in operation of such stacked-cell apparatus for exceeding any potential advantages to be achieved by mere structural changes to such apparatus. Thus, the invention provides new membrane moderated apparatus which is itself novel and is an integral part of the invention.

Figure 10:
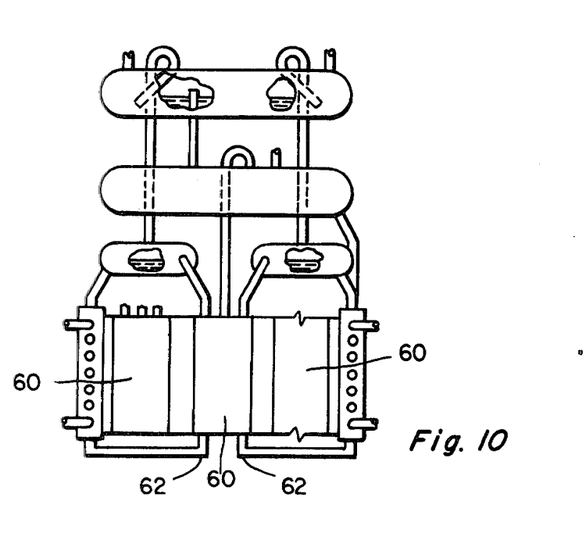
FIG. 10 is a schematic diagram of an electrolysis apparatus according to the invention.

FIG. 10 illustrates a schematically water electrolysis apparatus comprising 3 cells 60, each comprising membranes 62 as is generally known in the art. However when membranes prepared according Applicant's invention are utilized, extraordinary improvements are achieved in electroylysis parameters. Thus when membranes 62 are Nafion 120 membranes treated for 6 days in a $5\frac{1}{4}\%$ solution in DMF of polyether sulfone 200P, extraordinary improvements in operation are achieved at high current densities, say current densities of 1200 amps per square foot and higher. Indeed, a single cell test apparatus operated at 1500 amps per square foot has been found to perform well at voltages 30 millivolts below the voltage of typical prior art cells using prior art membranes unmodified by the process of the invention. Even more substantial advantages are achieved at higher voltage ratings.

It is to be understood that lower resistance of membranes and consequent lower $i^2R$ losses, allow lower mean temperature and/or lower cooling requirements are possible. This effect is of particular advantage in air operation of fuel cells. Even more advantageous in such fuel cells, wherein gaseous $H_2$ containing CO is used and CO is oxidized, is the use of the phosphoric acid-equilibrated membranes of the invention discussed hereinabove. Excellent water-vapor supression is obtained and extraordinary life of the apparatus is achieved.

It is further to be understood that the following claims are intended to cover all of the generic and specific features of the invention herein described.

What is claimed as new and desired to be secured by Letters Patent of the United States is:

1. A process for making an improved polymeric ion exchange membrane comprising the steps of treating an original polymeric membrane in a solution of polymeric solute, expanding the original membrane structure, removing, by action of said solution, a portion of said original membrane structure, and infusing at least some solute polymer from said solution into said expanded membrane structure.

2. A process as defined in claim 1 wherein said treatment is carried out for a time sufficient to increase the number of ion exchange sites available and to substantially reduce the electrical resistivity of said membrane while simultaneously infusing sufficient polymer to decrease the fluid permeability of the membrane.

3. A process as defined in claim 1 wherein said original membrane is an isotropic membrane.

4. A process as defined in claim 1 wherein said original membrane is formed of a fluorocarbon-based polymeric material.

5. A process as defined in claim 1 wherein said original membrane is formed of an olefin-based polymer.

6. A process as defined in claim 1 wherein said polymeric solute is a polyethersulfone polymer.

7. A process as defined in claim 1 wherein said polymeric solute is a polymer of a fluorinated hydrocarbon.

8. A process as defined in claim 2 wherein a small quantity of ion exchange capacity of said original membrane is removed during said process.

9. A process as defined in claim 2 wherein said original membrane is an isotropic membrane.

10. A process as defined in claims 2 or 3 wherein said original membrane is formed of a fluorocarbon-based polymeric material.

11. A process as defined in claims 2, 3 or 4 wherein said original membrane is formed of an olefin-based polymer.

12. A process as defined in claims 2, 3, 4 or 5 wherein said polymeric solute is a polyethersulfone polymer.

13. A process as defined in claim 2, 3, 4, 5 or 6 wherein said polymeric solute is a polymer of a fluorinated hydrocarbon.

14. A process as defined in claim 2, 3, 4, 5, 6, 7, or 8 wherein a substantial quantity of ion exchange capacity of said original membrane is removed during said process.

15. A process as defined in claim 2 wherein said reduction in resistivity is accompanied by a substantial decrease in permeability of said membrane to nitrogen.

16. A process for making a membrane comprising taking a solid polymeric residue formed by the process of claim 1 and forming it into a permeable membrane.

17. A process for making a membrane comprising recovering solute from the treating solution of claim 1 and forming a membrane from said solute.

18. A process as defined in claims 1, 3, 4, 5, 6, 7, or 8 comprising the additional step of equilibrating said membrane in a phosphoric acid electrolyte.

19. A process for making an improved polymeric ion exchange membrane by enhancing the electrical conductivity and the water-bearing capacity thereof while decreasing the permeability of said membrane to fluids, said process comprising the steps of
   (a) treating an ion exchange membrane in a solution of polymeric solute in a solvent, said solution forming a means to remove some polymeric material from said membrane, said treatment being carried out long enough to expand the original membrane structure and remove some said polymeric material by action of said solution and
   (b) washing said membrane.

20. A process as defined in claim 19 wherein said original ion exchange membrane is an extruded membrane and wherein the resin removed from said ion exchange membrane comprises less than 15% of said ion exchange capacity.

21. A process as defined in claims 19 wherein said molecular solute is generally linear having polymer weight of from 2000 to 200,000.

22. A process as defined in claim 21 wherever said solute polymer is polyether sulfate polymer.

23. A process as defined in claims 19, 20, 21 or 22 wherein said treatment is carried out for a time sufficient to yield, after washing, a membrane having resistivity of 5 to 50% of the resistivity of the ion exchange membrane subjected to the process.

24. A process as defined in claim 1 comprising additionally the step of equilibrating said improved membrane with phosphoric acid.

* * * * *